United States Patent
Nakajima

(10) Patent No.: US 7,474,958 B2
(45) Date of Patent: Jan. 6, 2009

(54) INFORMATION PROVIDING METHOD FOR VEHICLE AND INFORMATION PROVIDING APPARATUS FOR VEHICLE

(75) Inventor: Toshiharu Nakajima, Fujisawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/828,272

(22) Filed: Apr. 21, 2004

(65) Prior Publication Data

US 2004/0243300 A1 Dec. 2, 2004

(30) Foreign Application Priority Data

May 26, 2003 (JP) ............................. 2003-147872

(51) Int. Cl.
*G01C 21/26* (2006.01)

(52) U.S. Cl. .................. 701/200; 340/995.18; 369/1; 369/30.04

(58) Field of Classification Search ............... 701/209, 701/211, 200; 340/995, 995.18; 455/456; 369/1, 2, 30.04; *G01C 21/26, 21/34*
See application file for complete search history.

(56) References Cited

U.S. PATENT DOCUMENTS

| | | | | |
|---|---|---|---|---|
| 4,797,924 A | * | 1/1989 | Schnars et al. ............. | 704/275 |
| 5,041,983 A | * | 8/1991 | Nakahara et al. ............ | 701/209 |
| 5,115,399 A | * | 5/1992 | Nimura et al. .............. | 701/208 |
| 5,126,941 A | * | 6/1992 | Gurmu et al. ............... | 701/24 |
| 5,157,614 A | * | 10/1992 | Kashiwazaki et al. ....... | 701/200 |
| 5,274,560 A | * | 12/1993 | LaRue ...................... | 701/202 |
| 6,351,706 B1 | * | 2/2002 | Morimoto et al. .......... | 701/208 |
| 6,708,271 B1 | * | 3/2004 | Sasaki et al. .................. | 713/1 |
| 6,714,223 B2 | * | 3/2004 | Asami et al. ................ | 715/854 |
| 6,937,869 B1 | * | 8/2005 | Rayburn ..................... | 455/457 |
| 2001/0053956 A1 | * | 12/2001 | Ohishi et al. ............... | 701/209 |
| 2002/0156570 A1 | * | 10/2002 | Ohtsuji et al. .............. | 701/200 |
| 2003/0078057 A1 | * | 4/2003 | Watanabe et al. ........... | 455/456 |
| 2003/0083884 A1 | * | 5/2003 | Odinak et al. .............. | 704/275 |
| 2003/0216862 A1 | * | 11/2003 | Kawazoe et al. ............ | 701/211 |
| 2004/0236574 A1 | * | 11/2004 | Ativanichayaphong et al. | .. 704/231 |

FOREIGN PATENT DOCUMENTS

JP P2002-318132 A 10/2002

* cited by examiner

*Primary Examiner*—Tuan C To
(74) *Attorney, Agent, or Firm*—McDermott Will & Emery

(57) ABSTRACT

A user aboard a vehicle having installed therein an on-vehicle apparatus originates a call to an information center to indicate the specific type of information the user wishes to receive by following audio guidance provided by an interactive voice response device installed at the information center. The information center prepares the information desired by the user and transmits the information to the on-vehicle apparatus. In this vehicle information providing method, the contents of the audio guidance provided by the interactive voice response device are edited for each user based upon information pre-registered by the user.

5 Claims, 20 Drawing Sheets

FIG.4A

EXAMPLE OF CUSTOMIZATION EXECUTED ON THE WEB

400 TOP SCREEN

```
VEHICLE AUDIO SERVICE
WELCOME TO VEHICLE AUDIO SERVICE
ENTER YOUR MEMBER ID AND PASSWORD
  ID        [          ]
  PASSWORD  [          ]

[ PRESS HERE IF YOU
             ARE A NON-MEMBER ]
```

401

```
AUDIO SERVICE REGISTRATION   [TOP]

THE AUDIO SERVICE CAN BE
CUSTOMIZED TO SUIT YOUR NEEDS

CUSTOMIZE ?
       [YES]    [NO]
```

YES

402

```
TALK SCRIPT EDIT SCREEN      [TOP]

○ SELECT SERVICES YOU ARE LIKELY
   TO USE FREQUENTLY

1. GENERAL NEWS
  2. WEATHER FORECAST
     (WEEKLY)
  3. WEATHER FORECAST
     (TODAY/TOMORROW)
  4. TRAFFIC INFORMATION
  5. DESTINATION
  6. TELEPHONE SEARCH
  7. FORTUNE TELLING
  8. RESTAURANT
     INFORMATION             [RETURN]
  9. PROFESSIONAL
     BASEBALL NEWS           [SET]
```

① ②
TO FIGS.4A,4C AND 4E    FROM FIGS.4B,4D AND 4F

FIG.8

| STOCK DATE/TIME | 2002/10/10 7:32 | |
|---|---|---|
| USER ID | ****** | |
| PORTABLE TELEPHONE NUMBER | 090888888×× | |
| ... | ... | |
| STOCK INFORMATION | SERVICE TYPE | 10 | 10 TRAFFIC/11 WEATHER/... |
| | TITLE | PACIFIC COAST HIGHWAY | |
| | MAIN TEXT | ... | MAIN TEXT |
| | IMAGES | ... | IMAGE DATA |
| | ICONS | ... | ICON DATA |
| | ... | ... | |

FIG.9

| YEAR | MONTH | DAY | TIME | SERVICE | CONDITION 1 | CONDITION 2 | CONDITION 3 | CONDITION 4 | ... |
|---|---|---|---|---|---|---|---|---|---|
| 2002 | 8 | 2 | 7:07:00 | TRAFFIC INFORMATION | LINE 1 | A-CITY TO B-CITY | | | |
| 2002 | 8 | 5 | 10:00:30 | TRAFFIC INFORMATION | LINE 1 | B-CITY TO C-CITY | | | |
| 2002 | 8 | 15 | 20:11:02 | PROFESSIONAL BASEBALL UPDATE | | | | | |
| 2002 | 8 | 15 | 21:11:11 | PROFESSIONAL BASEBALL UPDATE | | | | | |
| 2002 | 8 | 16 | 21:00:00 | PROFESSIONAL BASEBALL UPDATE | | | | | |
| 2002 | 8 | 19 | 22:00:40 | PROFESSIONAL BASEBALL UPDATE | | | | | |
| 2002 | 8 | 20 | 19:20:30 | PROFESSIONAL BASEBALL UPDATE | | | | | |
| 2002 | 8 | 21 | 7:00:08 | WEATHER FORECAST | CALIFORNIA | EASTERN AREA | | | |
| 2002 | 8 | 25 | 7:50:55 | WEATHER FORECAST | CALIFORNIA | EASTERN AREA | | | |
| 2002 | 8 | 30 | 8:01:01 | WEATHER FORECAST | CALIFORNIA | EASTERN AREA | | | |
| 2002 | 8 | 30 | 15:03:20 | TRAFFIC INFORMATION | LINE 1 | A-CITY TO B-CITY | | | |
| 2002 | 9 | 1 | 12:12:30 | WEATHER FORECAST | CALIFORNIA | EASTERN AREA | | | |
| 2002 | 9 | 1 | 14:00:00 | TRAFFIC INFORMATION | LINE 1 | A-CITY TO B-CITY | | | |
| 2002 | 9 | 1 | 20:11:02 | PROFESSIONAL BASEBALL UPDATE | | | | | |
| 2002 | 9 | 2 | 21:11:11 | PROFESSIONAL BASEBALL UPDATE | | | | | |
| 2002 | 9 | 3 | 21:00:00 | PROFESSIONAL BASEBALL UPDATE | | | | | |
| 2002 | 9 | 5 | 7:00:10 | TRAFFIC INFORMATION | LINE 3 | D-CITY TO E-CITY | | | |
| 2002 | 9 | 5 | 8:00:00 | TRAFFIC INFORMATION | LINE 1 | C-CITY TO F-CITY | | | |
| 2002 | 9 | 6 | 18:55:53 | WEATHER FORECAST | CALIFORNIA | WESTERN AREA | | | |
| 2002 | 9 | 8 | 11:11:11 | WEATHER FORECAST | CALIFORNIA | EASTERN AREA | | | |
| 2002 | 9 | 8 | 19:20:30 | PROFESSIONAL BASEBALL UPDATE | | | | | |
| 2002 | 9 | 8 | 22:00:40 | PROFESSIONAL BASEBALL UPDATE | | | | | |
| 2002 | 9 | 9 | 22:00:40 | PROFESSIONAL BASEBALL UPDATE | | | | | |
| 2002 | 9 | 9 | 23:59:59 | WEATHER FORECAST | CALIFORNIA | EASTERN AREA | | | |
| ... | ... | ... | ... | ... | ... | ... | | | |

FIG.10A

TABULATION RESULT EXAMPLE (1)

| SERVICE | NUMBER OF TIMES SERVICES RECEIVED | CONDITION 1 | NUMBER OF TIMES SERVICES RECEIVED | CONDITION 2 | NUMBER OF TIMES SERVICES RECEIVED | ... |
|---|---|---|---|---|---|---|
| PROFESSIONAL BASEBALL UPDATE | 20 | - | 20 | - | 20 | |
| WEATHER FORECAST | | 13 CALIFORNIA | | 13 EASTERN AREA | 12 | |
| | | | | WESTERN AREA | 1 | |
| TRAFFIC INFORMATION | | 26 LINE 1 | | 16 A-CITY TO B-CITY | 11 | |
| | | | | B-CITY TO C-CITY | 4 | |
| | | | | C-CITY TO F-CITY | 1 | |
| | | LINE 3 | | 10 D-CITY TO E-CITY | 10 | |
| ... | | | | | | |

FIG.10B

TABULATION RESULT EXAMPLE (2)

| | SERVICE | NUMBER OF TIMES SERVICES RECEIVED | CONDITION 1 | NUMBER OF TIMES SERVICES RECEIVED | CONDITION 2 | NUMBER OF TIMES SERVICES RECEIVED | ... |
|---|---|---|---|---|---|---|---|
| WEEKDAY | PROFESSIONAL BASEBALL UPDATE | 18 | - | 18 | - | 18 | |
| | TRAFFIC INFORMATION | | 24 LINE 1 | | 14 A-CITY TO B-CITY | 11 | |
| | | | | | B-CITY TO C-CITY | 3 | |
| | | | LINE 3 | | 10 D-CITY TO E-CITY | 10 | |
| HOLIDAY | PROFESSIONAL BASEBALL UPDATE | 2 | - | 2 | - | 2 | |
| | WEATHER FORECAST | | 13 CALIFORNIA | | 13 EASTERN AREA | 12 | |
| | | | | | WESTERN AREA | 1 | |
| | TRAFFIC INFORMATION | | 2 LINE 1 | | 2 A-CITY TO B-CITY | 1 | |
| | | | | | B-CITY TO F-CITY | 1 | |
| ... | | | | | | | |

FIG.12

| EXTRACTION CONDITION | PARAMETER | DETAILS |
|---|---|---|
| NUMBER OF EXTRACTIONS | 3 | NUMBER OF SERVICES / CONDITIONS TO BE BUILT INTO A HIGHER-ORDER HIERARCHICAL LAYERS IN THE TALK FLOW (PARAMETER 3 INDICATES THAT THREE ITEMS, PROFESSIONAL BASEBALL, WEATHER AND TRAFFIC INFORMATION FROM A-CITY TO B-CITY, ARE BUILT INTO THE HIGHER-ORDER HIERARCHICAL LAYERS, AS SHOWN IN FIG. 11) |
| EXTRACTION LEVEL | 2 | THE SERVICE/CONDITION LEVEL (THE LEVEL OF DETAILS) AT WHICH SERVICE/CONDITIONS FREQUENTLY USED BY THE USER ARE TO BE EXTRACTED BASED UPON THE TABULATION RESULTS. THE FREQUENTLY USED SERVICE/CONDITIONS ARE EXTRACTED BASED UPON THE TABULATION RESULTS IN CONFORMANCE TO THIS LEVEL AND THE TALK FLOW IS FORMATTED TO INCLUDE ALL THE DIFFERENT TYPES OF SERVICES THUS EXTRACTED.<br>0: SERVICE<br>1: CONDITION 1<br>2: CONDITION 2<br>( 2 INDICATES CONDITION 2, AND ACCORDINGLY, THE THREE MOST FREQUENTLY USED SERVICES (AS THE NUMBER OF EXTRACTIONS IS SET AT THREE), I.E., PROFESSIONAL BASEBALL, WEATHER FORECAST FOR THE EASTERN AREA OF CALIFORNIA STATE AND TRAFFIC INFORMATION FOR PACIFIC COAST HIGHWAY FROM A-CITY TO B-CITY, ARE BUILT INTO THE FLOW AT CONDITION 2 SETTING). THE LEVEL MAY BE SET INDIVIDUALLY FOR EACH SERVICE (SEE EXTRACTION 1 BELOW) |
| (EXTRACTION LEVEL 1 (TRAFFIC)) | ・・・ | EXTRACTION LEVEL FOR TRAFFIC INFORMATION (WHEN THE EXTRACTION LEVEL FOR TRAFFIC INFORMATION IS SET TO 0 AND THE EXTRACTION LEVELS FOR ALL THE OTHER SERVICES ARE SET TO 2, TRAFFIC INFORMATION/PROFESSIONAL BASEBALL/WEATHER FOR EASTERN AREA OF CALIFORNIA STATE ARE BUILT INTO THE TALK FLOW) |
| (EXTRACTION LEVEL 2 (NEWS)) | ・・・ | EXTRACTION LEVEL FOR NEWS |
| ・・・ | | |

FIG.13A

| DATE/TIME | IVR1 | IVR RECOGNITION RESULTS 1 (RESULTS OF IVR RECOGNITION OF SPEECH BY A USER) | IVR2 | IVR RECIGNITION RESULT 2 | IVR3 | IVR RECIGNITION RESULT 3 |
|---|---|---|---|---|---|---|
| 2002/2/2 15:00 | "SPECIFY A SERVICE YOU WISH TO ..." | "TRAFFIC INFORMATION" | "ARE YOU REQUESTING TRAFFIC INFORMATION?" | "YES" | "SPECIFY A ROAD" | "PACIFIC COAST HIGHWAY" |
| 2002/2/5 9:00 | "SPECIFY A SERVICE YOU WISH TO ..." | "GENERAL NEWS" | "ARE YOU REQUESTING GENERAL NEWS?" | "YES" | "SPECIFY A CATEGORY YOU ARE INTERESTED IN" | (NO SUCCESSFUL RECOGNITION) |
| 2002/2/6 12:00 | "SPECIFY A SERVICE YOU WISH TO ..." | "WEATHER FORECAST" | "ARE YOU REQUESTING WEATHER FORECAST?" | "YES" | "SPECIFY A STATE" | "ALABAMA STATE" |
| 2002/2/6 12:00 | "..." | "..." | "..." | "..." | "..." | "..." |
| ... | ... | ... | ... | ... | ... | ... |

(A PORTION OF THE USER'S SPEECH "KABU" IS NOT RECOGNIZED)
(A PORTION OF THE USER'S SPEECH "CALIFORNIA STATE" IS ERRONEOUSLY RECOGNIZED)

FIG. 13B

| IVR4 | IVR RECIGNITION RESULT 4 | IVR5 | IVR RECIGNITION RESULT 5 | IVR6 | IVR RECIGNITION RESULT 6 | ... |
|---|---|---|---|---|---|---|
| "ARE YOU REQUESTING TRAFFIC INFORMATION FOR PACIFIC COAST HIGHWAY?" | "YES" | "SPECIFY AN AREA" | "FROM A-CITY TO B-CITY" | "ARE YOU REQUESTING TRAFFIC INFORMATION FOR PACIFIC COAST HIGHWAY FROM A-CITY TO B-CITY?" | "..." | ... |
| "WE HAVE NOT BEEN ABLE TO RECOGNIZE YOUR REQUEST. PLEASE STATE YOUR REQUEST AGAIN" | "STOCK MARKET" | "ARE YOU REQUESTING INFORMATION ON STOCK PRICES?" | "YES" | "..." | | |
| "ARE YOU REQUESTING WEATHER FORECAST FOR ARIZONA STATE?" | "NO" | "WE ARE SORRY. PLEASE SPECIFY THE STATE AGAIN" | "ALABAMA STATE" | "ARE YOU REQUESTING WEATHER FORECAST FOR ALABAMA STATE?" | DISCONNECT LINE | |
| "..." | "..." | "..." | "..." | "..." | "..." | |
| ... | ... | ... | ... | ... | ... | ... |

FIG.14

(CONDITIONS ONLY)

| STOCK DATE/TIME | | 2002/10/10 7:32 |
|---|---|---|
| USER ID | | * * * * |
| PORTABLE TELEPHONE NUMBER | | 090888888XX |
| . . . | | . . . |
| STOCK INFORMATION | SERVICE TYPE | 10 |
| | CONDITION 1 | PACIFIC COAST HIGHWAY |
| | CONDITION 2 | A-CITY TO B-CITY |
| | . . . | . . . |

10 TRAFFIC /11WEATHER/···

United States Patent US 7,474,958 B2

INFORMATION PROVIDING METHOD FOR VEHICLE AND INFORMATION PROVIDING APPARATUS FOR VEHICLE

BACKGROUND OF THE INVENTION

1. Field of the Invention

The present invention relates to an information providing method for vehicle and an information providing apparatus for vehicle to be adopted to provide necessary information to a vehicle in response to a request issued from the vehicle.

2. Description of the Related Art

There is an information providing system known in the related art that includes an interactive voice response apparatus installed at an information center which provides various types of information to vehicles in response to requests issued from the vehicles by recognizing the types of information desired by an operator aboard the vehicle (user) without requiring any intervention of an operator at the information center (see Japanese Laid Open Patent Publication No. 2002-318132). In this system, the user responds to audio guidance (prompts) provided by the interactive voice response apparatus to enable the information center to recognize the type of information desired by the user.

SUMMARY OF THE INVENTION

However, a given vehicle user may desire many different types of information. In such a case, a problem arises in that the interactive voice response apparatus providing audio guidance and the user must engage in a lengthy dialogue in the information providing system in the related art described above.

The present invention provides an information providing method for vehicle and an information providing apparatus for vehicle through which automatic audio guidance that is customized for individual user's needs is offered when providing information to users in vehicles having on-vehicle apparatuses installed therein.

An information providing apparatus for vehicle according to the present invention includes an information storage device in which a plurality of different types of information to be provided to a user aboard a vehicle having an on-vehicle apparatus installed therein are stored, an interactive voice response device having a speech recognition function that provides audio guidance edited for each user and engages in a dialogue with the user through automatic voice response via a telephone line, an information acquisition device that obtains information determined based upon the dialogue between the user and the interactive voice response device from the information storage device and an information transmission device that transmits the information obtained by the information acquisition device to the on-vehicle apparatus.

In an information providing method for vehicle according to the present invention, a user aboard a vehicle having an on-vehicle apparatus installed therein who has called to an information center is verified, an audio guidance which is edited for each user by an interactive voice response apparatus installed at the information center is provided, information desired by the user based upon a dialogue between the user and the interactive voice response apparatus is determined and the determined information is transmitted to the on-vehicle apparatus.

BRIEF DESCRIPTION OF THE DRAWINGS

FIG. 4A-FIG. 4F show the sequence of the talk flow customization executed in the interactive voice response service;

FIG. 8 presents an example of stock information (transmission data) stored in the user profile database;

FIG. 9 presents an example of the service contents recorded in the user profile database;

FIGS. 10A and 10B each present an example of the results of service contents tabulation;

FIG. 12 summarizes the method adopted to extract services and conditions to be built into higher-order hierarchical layers in the talk flow;

FIGS. 13A and 13B present an example of data recorded in the user profile database in the information providing system for vehicle in a third embodiment;

FIG. 14 presents an example of information providing conditions saved in the user profile database 56;

DETAILED DESCRIPTION OF THE PREFERRED EMBODIMENTS

First Embodiment

Figure 1:
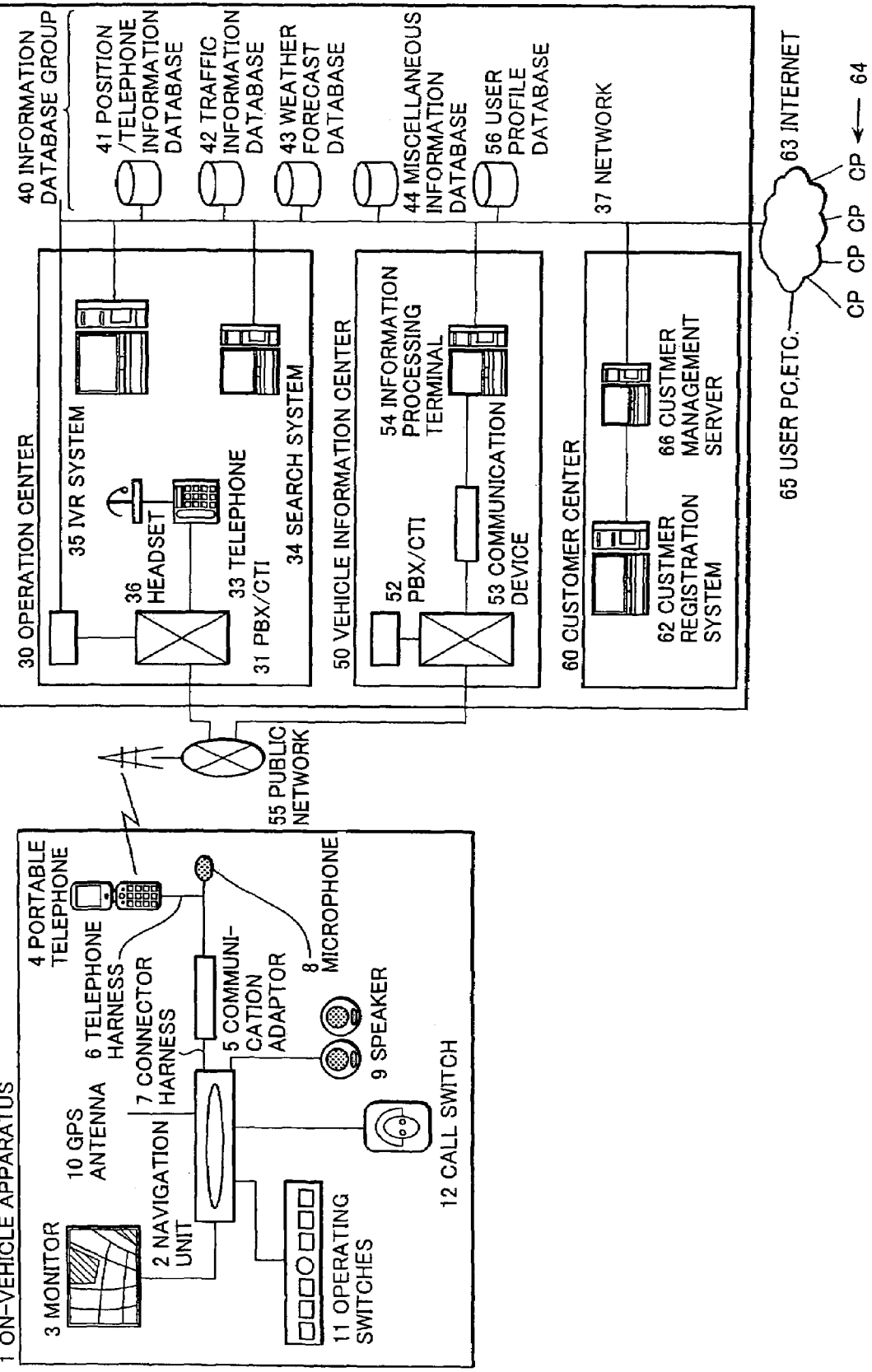
FIG. 1 shows the overall structure adopted in a first embodiment of the information providing system for vehicle that includes the information providing apparatus for vehicle according to the present invention.

FIG. 1 shows the overall structure adopted in the first embodiment of the information providing system for vehicle having the information providing apparatus for vehicle according to the present invention. A user of this information providing system for vehicle issues a request for desired information to an information center (information providing apparatus for vehicle) 20 via an on-vehicle apparatus 1 and downloads the information prepared by the information center 20 to the on-vehicle apparatus 1.

The on-vehicle apparatus 1 includes a navigation unit 2, a monitor 3, a communication adapter 5, a telephone harness 6 used to connect a portable telephone 4 to the communication adapter 5, a connector harness 7 used to connect the communication adapter 5 to the navigation unit 2, a microphone 8, a speaker 9, a GPS antenna 10, operating switches 11 and an operator call switch 12.

The navigation unit 2, which includes a CPU, a ROM, a RAM and the like (not shown), is equipped with a function of searching for a route to be taken to reach a destination. At the monitor 3, the current position of the vehicle, the recommended route to the destination calculated at the navigation unit 2 and the like are displayed. In addition, information such as traffic information and weather forecast downloaded from the information center 20 can be displayed at the monitor 3, as well. The portable telephone 4 is used to talk to an operator in standby at the information center 20 or to engage in data communication with the information center 20.

The microphone 8 is used to talk to the operator at the information center 20 or to engage in a dialog with an IVR system 35 to be detailed later through a handsfree system. Through the speaker 9, the information downloaded from the information center 20 is output as audio information, or the speech of the operator or the IVR system 35 is generated as an audio output during a dialogue between the user and the operator or the IVR system 35 carried out through the handsfree system. Radio waves transmitted from a GPS satellite (not shown) are received at the GPS antenna 10 to obtain information indicating the current vehicle position.

The operating switches 11 are operated to perform various operations, e.g., to manipulate the screen displayed at the monitor 3, to use the handsfree system or to perform data communication. The operating switches 11 include a download button (not shown) which is operated to download information from the information center 20. The operator call switch 12 is operated to originate a call to the information center 20.

The communication with the information center 20 is controlled via the communication adapter 5. At the communication adapter 5, the telephone number of an operation center 30 at the information center 20, which is to be detailed later, is registered, and as the user presses the operator call switch 12, a call is automatically originated to connect with the operation center 30 via the portable telephone 4. The telephone number of the operation center 30 may be registered, for instance, before the communication adapter 5 is shipped from the factory.

The information center 20 includes the operation center 30, an information database group 40, a vehicle information center 50 and a customer center 60. The operation center 30, the information database group 40, the vehicle information center 50 and the customer center 60 are connected with one another via a network 37 such as a LAN.

The operation center 30 includes a PBX/CTI 31 that controls telephone lines, a telephone 33, an information search system 34, the IVR system 35 and a headset 36. A PBX (private branch exchange), which is normally installed in an office building or the like, functions as a switchboard to connect an outside telephone line with an extension line and to connect an extension line to another extension line. A CTI (computer technology integration) integrates a telephone communication system such as a PBX with an information system including a computer, a database and the like and allows the telephone communication system and the information system to interlock with each other. In other words, the PBX/CTI 31 implements telephone line control so as to connect a call made by a user to an operator or the IVR system 35, for instance.

Figure 2:
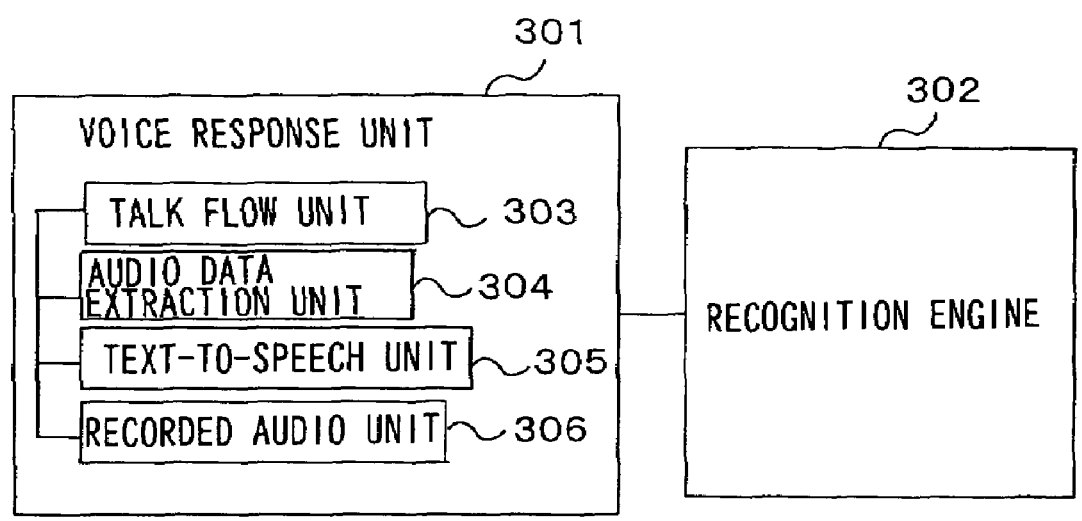
FIG. 2 shows the structure adopted in the IVR system in detail.

The IVR system (interactive voice response system) 35 is a computer system capable of providing interactive voice response and is equipped with a speech recognition function and a speech synthesizing function. The structure of the IVR system 35 is shown in detail in FIG. 2. The IVR system 35 in the embodiment includes a voice response unit 301 and a recognition engine 302. The voice response unit 301 includes a talk flow unit 303, an audio data extraction unit 304, a text-to-speech unit 305 and a recorded audio unit 306.

The audio data extraction unit 304 extracts audio data corresponding to the speech made by the user (user response speech) from collected audio that contains the user speech and background noise, and transmits the extracted audio data to the recognition engine 302. The recognition engine 302 executes speech recognition processing on the audio data and transmits the results of the recognition processing to the voice response unit 301. The voice response unit 301 extracts talk data to be used to provide guidance for the user from the talk flow unit 303 based upon the results of the speech recognition processing executed by the recognition engine 302, converts the talk data to audio data via the text-to-speech unit 305 and provides guidance for the user. At this time, audio data stored in advance at the recorded audio unit 306 maybe output. It is to be noted that various types of speeches to be used to conduct a dialogue with the user are stored at the talk flow unit 303.

Figure 3:
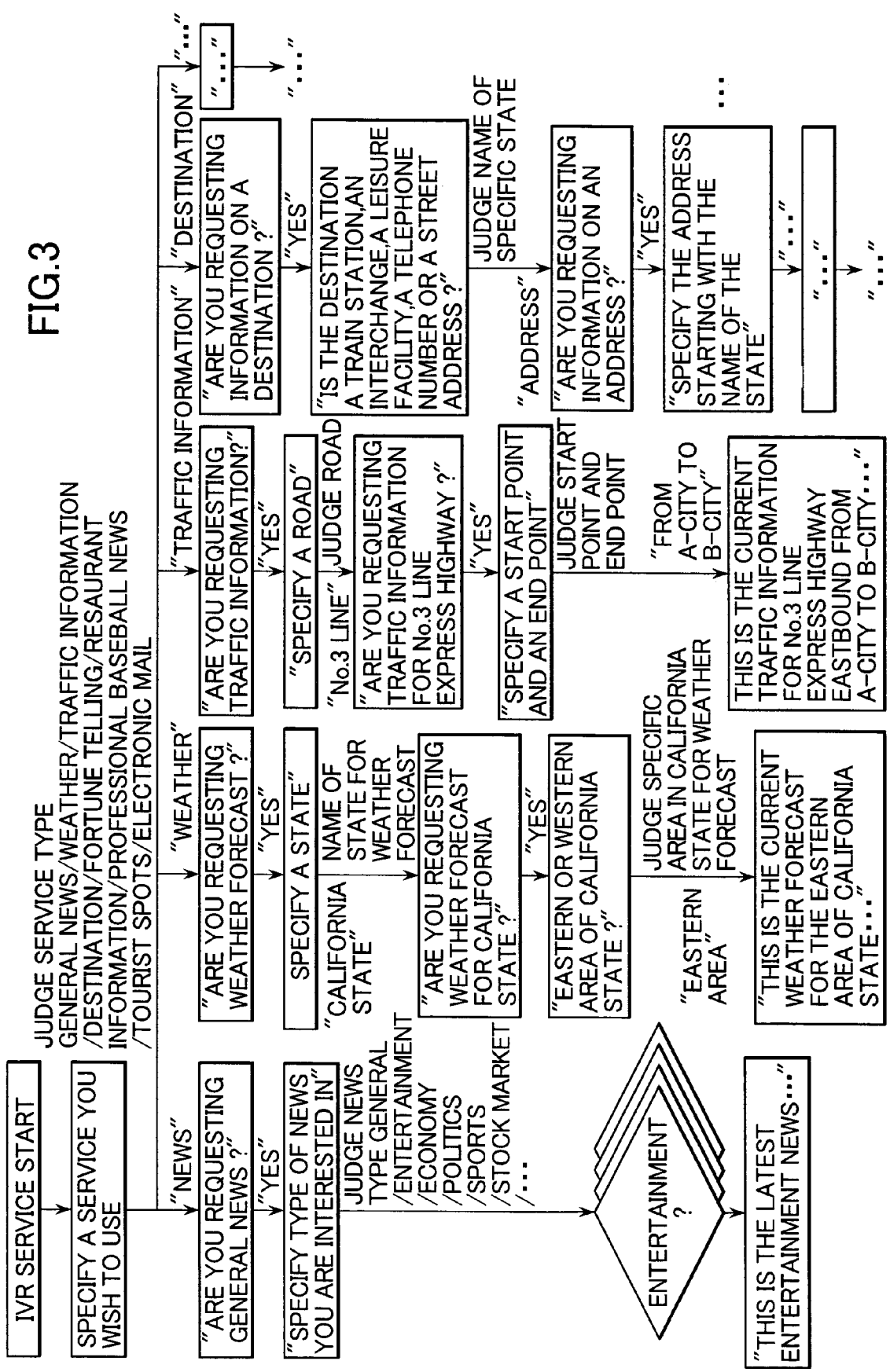
FIG. 3 presents an example of an interactive voice response service.

FIG. 3 presents an example of the flow of standard interactive voice response service (IVR service) provided by the IVR system 35. As the interactive voice response service by the IVR system 35 starts, audio guidance is first provided in the form of, for instance, an audio message "Please select the desired service" to prompt the user to request a desired type of information. If the user says "weather", for instance, the audio data of the speech made by the user are transmitted to the recognition engine 302 via the audio data extraction unit 304, and the recognition engine 302 executes the speech recognition processing. Based upon the results of the speech recognition processing, the voice response unit 301 extracts a speech ("Are you requesting weather information?") as a response to the user's speech, i.e. "weather", from the talk flow unit 303 and provides audio guidance to the user via the text-to-speech unit 305.

Subsequently, audio guidance is provided to prompt the user to specify a region such as a state and an area (the eastern or western area of the state) and thus, the information to be provided to the user is determined as shown in FIG. 3. FIG. 3 shows that the user is requesting weather information with regard to "weather in the eastern area of California State". Various types of information including general news, weather, traffic information, destination information related to a destination to be set at the navigation unit 2, fortune telling, restaurant information, sports information, tourist site information and electronic mail can be provided to the user. Speeches to be used to provide appropriate audio guidance for the user are prepared in advance in correspondence to the individual types of information and are stored in the talk flow unit 303.

The IVR system 35 is installed at the operation center 30 in the information providing system for vehicle in the first embodiment and operators are on duty at the operation center 30. An operator talks to the user via the telephone 33 or the headset 36. In addition, the operator searches for the information desired by the user by using the information search system 34. The information search system 34 and the IVR system 35 are both connected with a plurality of databases 41 to 44 and 56 constituting the information database group 40 through the network 37 which may be a LAN.

The information database group 40 includes a position/telephone information database 41, a traffic information database 42, a weather forecast database 43, a miscellaneous information database 44 and a user profile database 56.

At the position/telephone information database 41, position information and telephone number information with regard to various types of facilities such as restaurants and public facilities are stored. In the traffic information database 42, traffic information on standard roads and toll roads is stored. Weather forecast information for various regions is stored at the weather forecast database 43. Information other than the information on the various types of facilities, the traffic information and the weather information described above is stored in the miscellaneous information database 44. User information indicating the name, the residential address, the portable telephone number and the like of each pre-registered user is stored in the user profile database 56. The method of user registration is to be detailed later.

The vehicle information center 50 includes a PBX/CTI 52 that implements control of telephone lines, a communication device 53 and an information processing terminal 54. The communication device 53 engages in data communication with the on-vehicle apparatus 1. The information processing terminal 54 executes various types of data processing such as information transmission to the on-vehicle apparatus 1 via the communication device 53. It is to be noted that the PBX/CTI 31 at the operation center 30 and the PBX/CTI 52 at the vehicle information center 50 are both connected to a public telephone network 55.

The customer center 60 includes a customer registration system 62 and a customer management server 66. Users are registered and personal information of registered users is updated in the customer registration system 62. The customer management server 66, which is connected with the customer registration system 62, manages the user information.

The network 37 to which the operation center 30, the information database group 40, the vehicle information center 50 and the customer center 60 are connected is also connected with the Internet 63. Thus, the information center 20 is able to exchange various types of information with a content provider/application service provider group 64 via the Internet 63. In addition, during a user registration which is to be described in detail later, the user may register himself from a terminal 65 such a personal computer connected with the Internet 63, without talking to the operator at the customer center 60.

In order to use the information providing system for vehicle in the first embodiment, the user needs to pre-register himself as a user. He may register himself at the information providing system for vehicle by mail, by entering general information such as the user name, the residential address and the date of birth together with the telephone number of the portable telephone 4 into a specific form and mailing the form to the customer center 60 at the information center 20. After verifying the contents of the signup form, the operator at the customer center 60 performs user registration processing to register the user at the customer management server 66 via the customer registration system 62. The user information on the registered user is stored into the user profile database 56.

Alternatively, the user may directly register himself at the customer management server 66 via the terminal 65 such as a personal computer connected with the Internet 63 as described earlier. As a further alternative, if the on-vehicle apparatus 1 is equipped with an on-line registration function, the user may directly register himself at the customer management server 66 through the on-vehicle apparatus 1. Upon completing a user registration processing executed to register the user at the customer management server 66, a user ID and a password are issued to the user.

In the interactive voice response service provided by the IVR system 35 in the information providing system for vehicle in the first embodiment, services are customized to meet specific needs of individual users instead of offering a uniform service to all users. Namely, the flow of the interactive voice response service shown in FIG. 3 is customized to meet the various needs of individual users. The following is an explanation of a method adopted to allow each user to customize the talk flow of the interactive voice response service.

FIG. 4A-FIG. 4F show the sequence of the talk flow customization performed by the user to customize the talk flow of the interactive voice response service by accessing the Internet 63 through the terminal 65 such as a personal computer.

First, the user accesses a home-page to perform the talk flow customization. At the home-page, fields for the user to enter the user ID and the user password are displayed, as in screen 400, and the user enters the user ID and the user password having been issued upon completion of the user registration processing into the appropriate fields.

After the user is authenticated based upon the user ID and the password, a screen 401 is brought up on display to verify whether or not a talk flow customization is to be performed. If the user presses (clicks) the "yes" button indicating that he wishes to customize the talk flow, a screen 402 listing various services to allow the user to select the services he is likely to utilize frequently is then brought up on display. In the screen 402, general news, weather forecast (weekly), weather forecast (today/tomorrow), traffic information, destination information, telephone connection, fortune telling, restaurant information and professional baseball news are listed as information services that can be provided by the information center 20 to the user (the on-vehicle apparatus 1). The user selects services to which he wishes to give priority in this service selection menu. The services to which the user wishes to give priority may be, for instance, a service that he is likely to utilize frequently, a service that requires the user to specify a great number of conditions to obtain the service in the standard talk flow shown in FIG. 3, or a service that needs to be obtained quickly in an emergency.

Figure 4B:
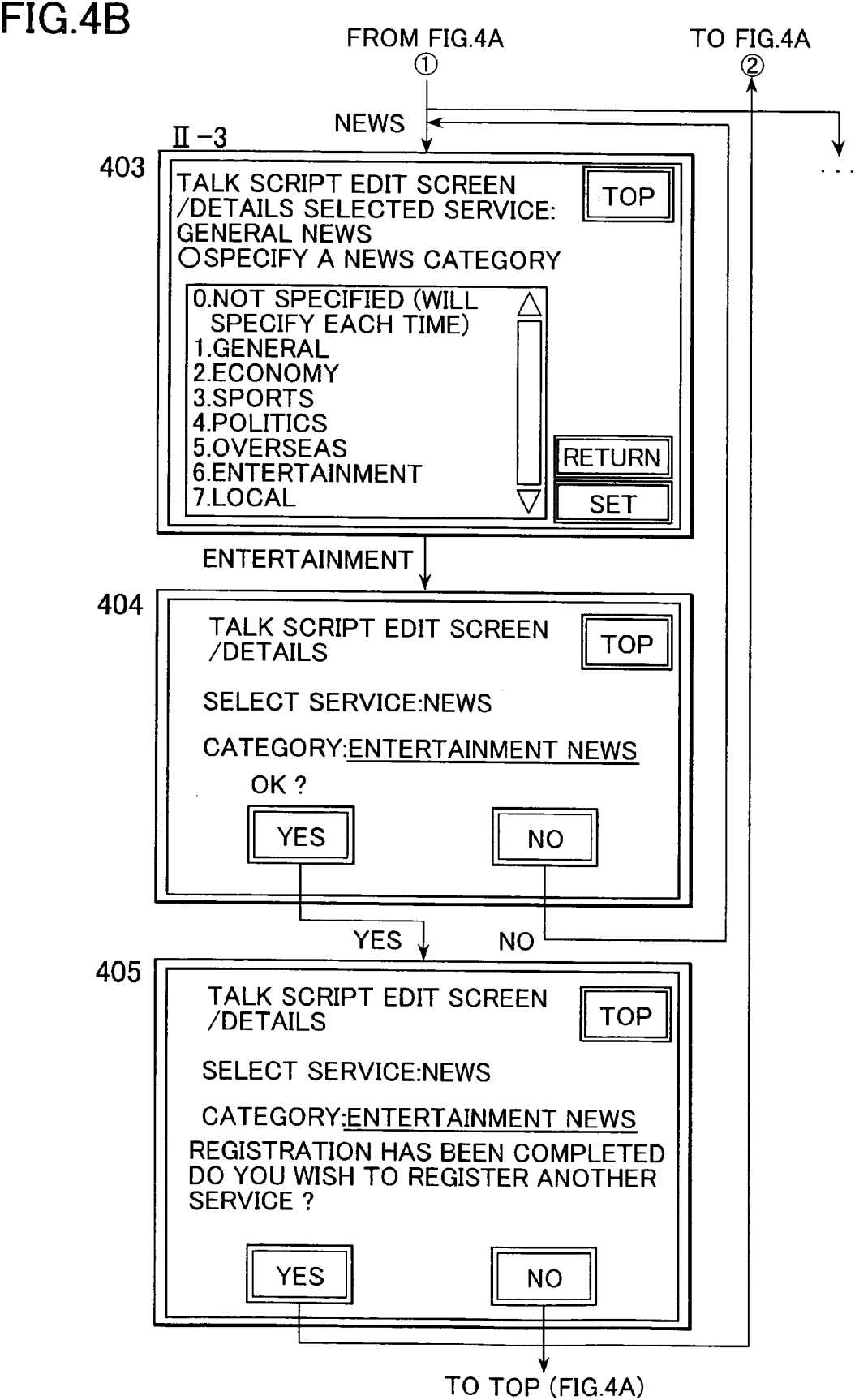
Figure 4C:
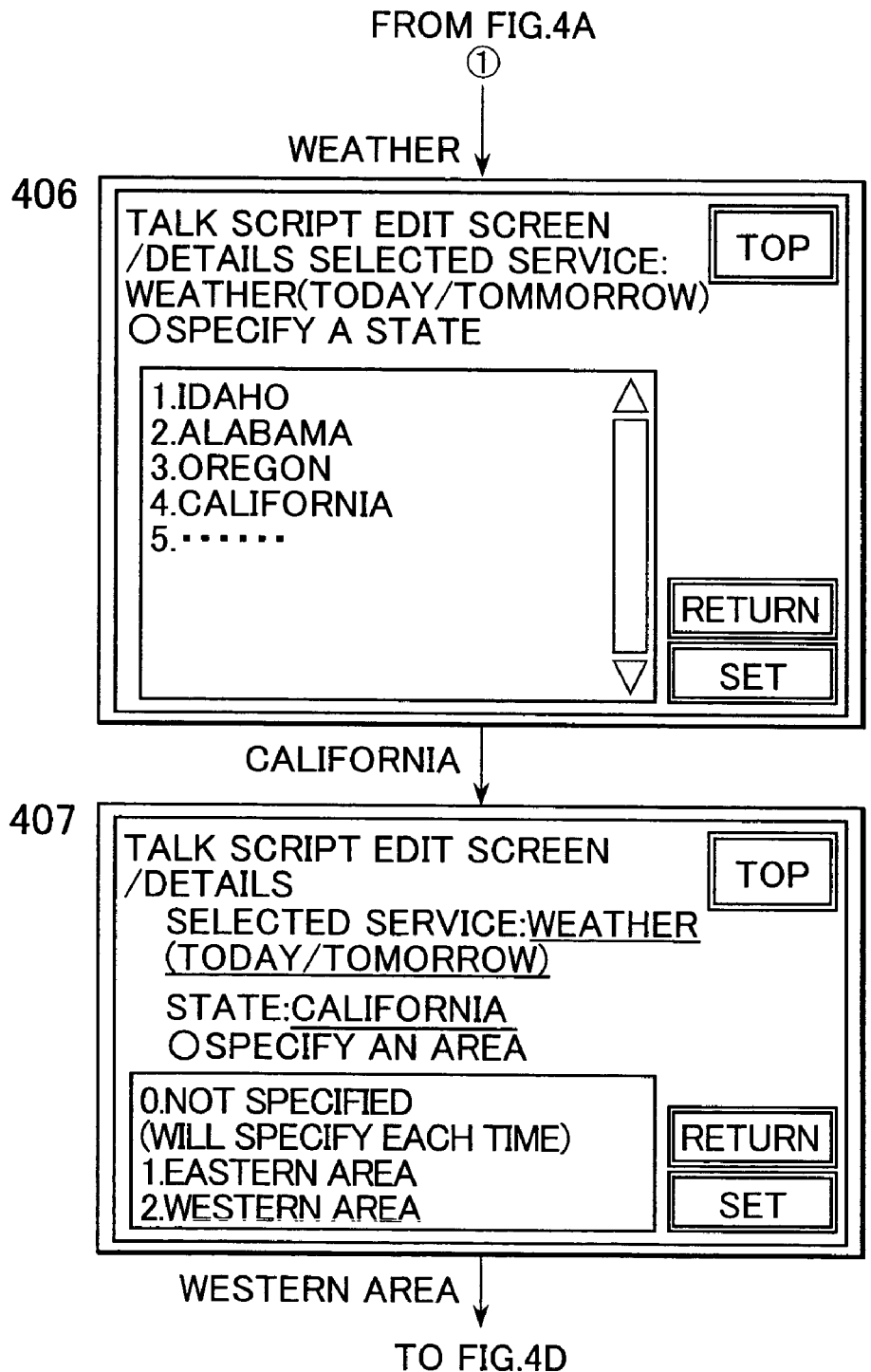
Figure 4D:
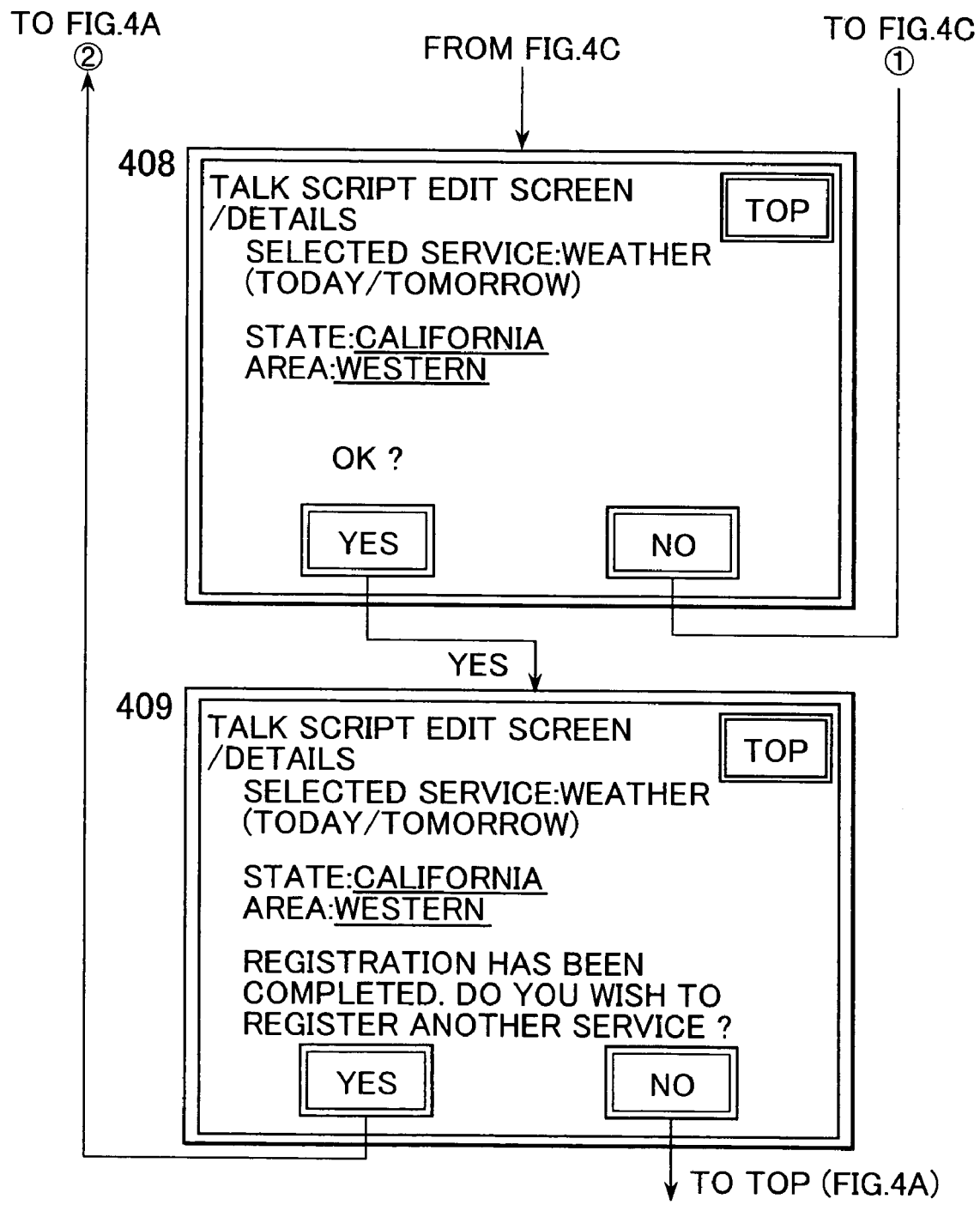
Figure 4E:
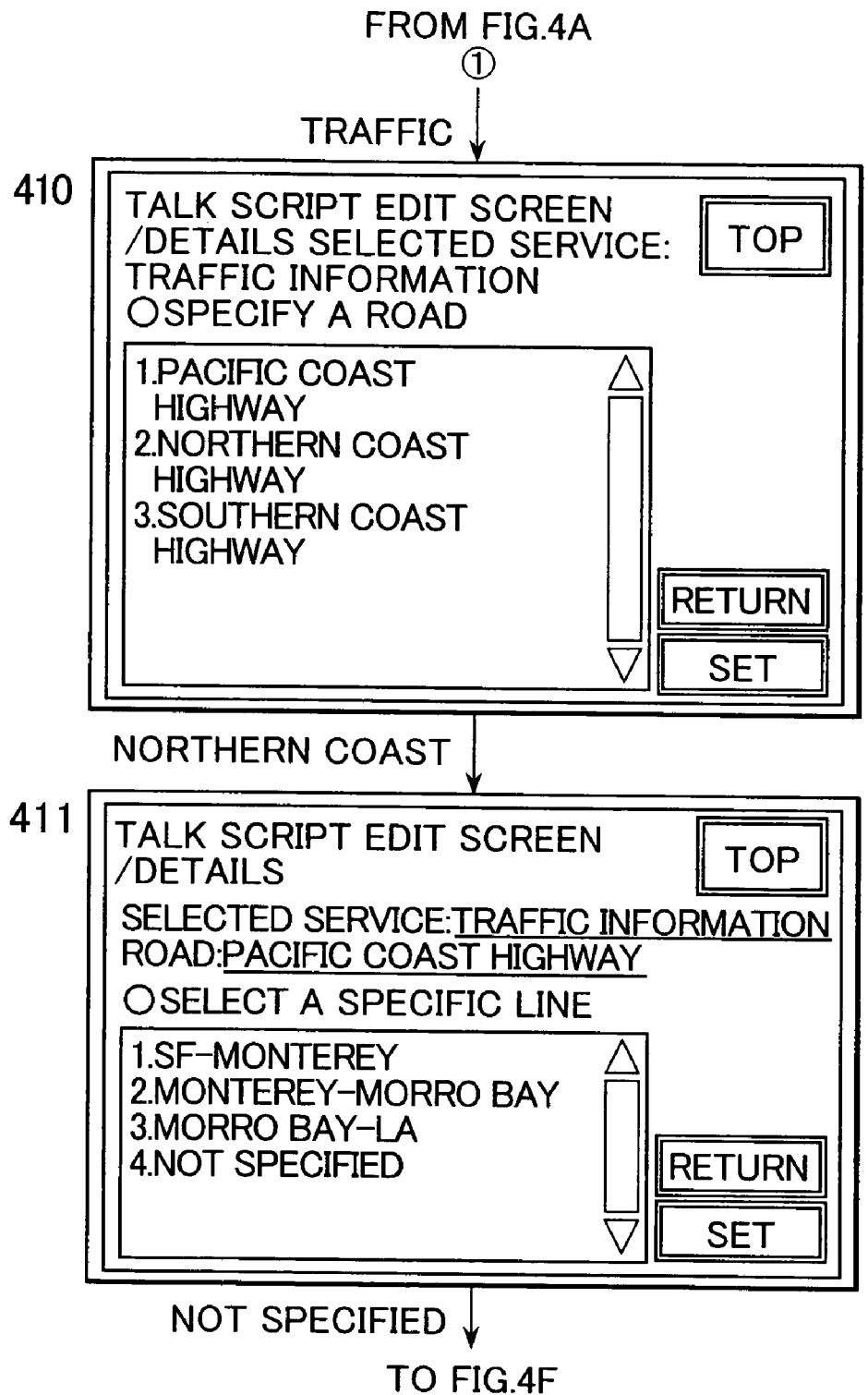
Figure 4F:
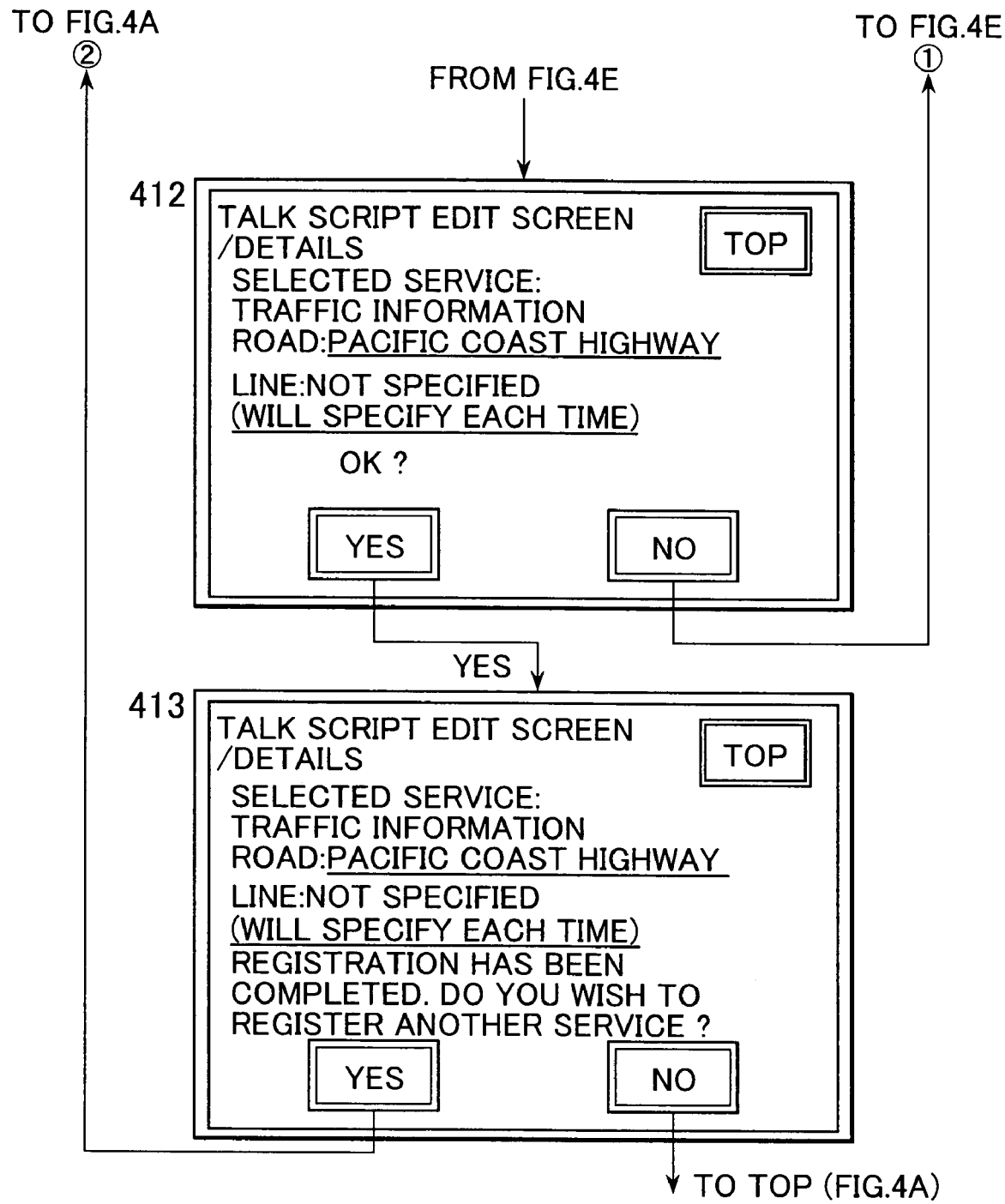

If the user selects "general news" in the service selection menu, a screen which allows the user to select more specific news contents, such as a screen 403 shown in FIG. 4B, is brought up on display. If the user selects "entertainment news" while this screen is on display, a screen 404 with a message "Entertainment news OK?" is brought up on display for confirmation. If the user presses the "yes" button in response, "general news" is selected as the desired service and "entertainment news" is registered as a preferred category of the "general news" as in a screen 405. This registration is achieved by storing the selected category into the user profile database 56 in correspondence to the user information.

Figure 5:
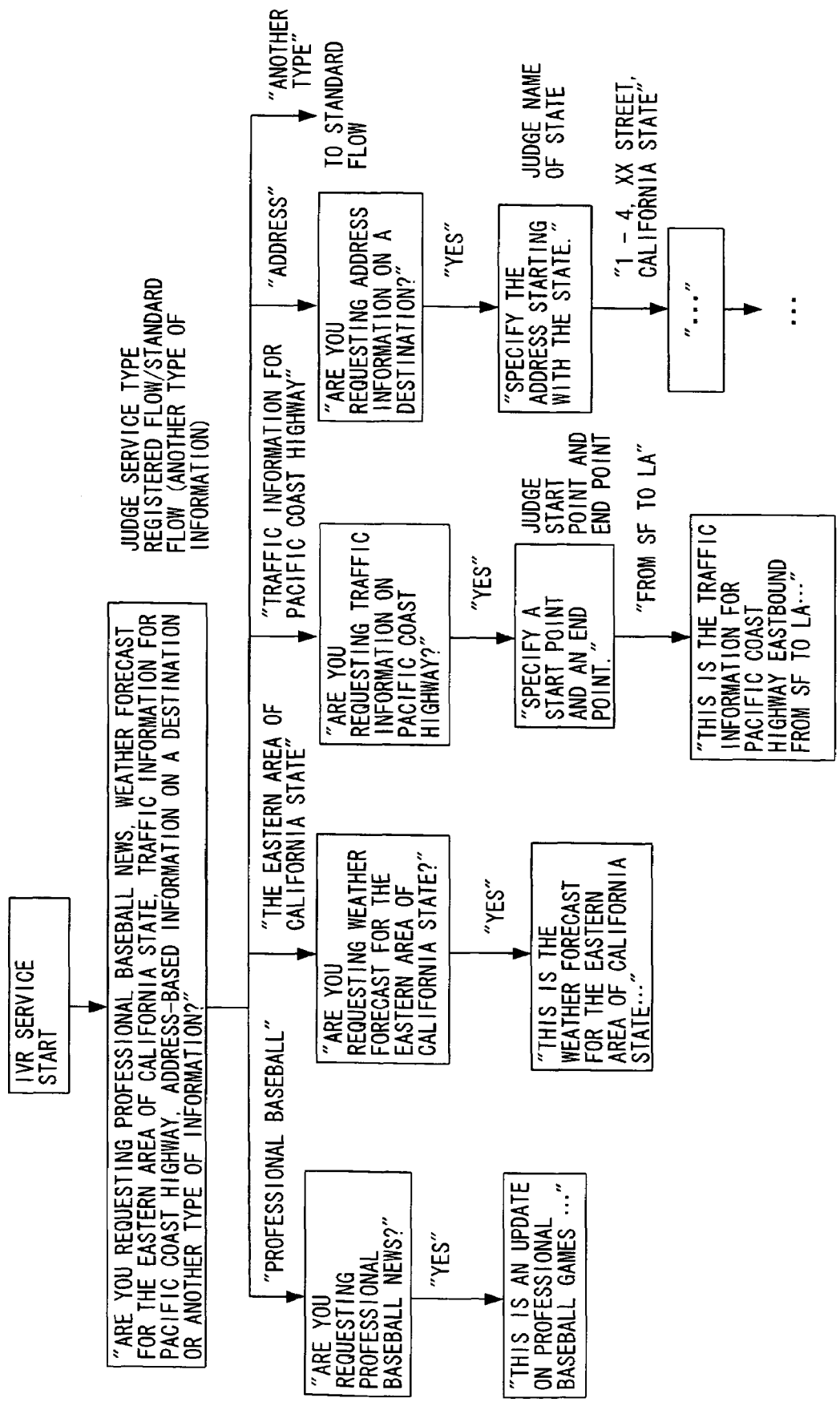
FIG. 5 presents an example of a customized talk flow.

The user may select and register a plurality of services which he wishes to give priority to. FIG. 5 shows an example of a talk flow customized based upon the registered services (registered information types). In this example, the user has pre-registered four services, "professional baseball information", "weather forecast for the eastern area of California State", "traffic information for Pacific Coast Highway" and "destination setting by address".

In the customized talk flow, the user is initially asked whether he wishes to receive a pre-registered service or a service other than the pre-registered services. The user is allowed to indicate whether he wishes to select a desired service from the pre-registered services or to select another service that is not pre-registered. If he indicates that he wishes to select another service, the standard talk flow which is not customized to meet his particular needs is provided.

Namely, in the information providing system for vehicle in the embodiment, the user can pre-register services he wishes to give priority to and, as a result, he can receive the services he uses frequently in a speedy manner. For instance, if he wishes to obtain "weather information for the eastern area of California State" through the standard talk flow, he needs to first specify "weather information" from the plurality of services, then specify the state and finally specify "eastern area" as shown in FIG. 3. In contrast, in the customized talk flow, the user simply needs to specify "weather information for the eastern area of California State" at the beginning. The talk flow customized for each user is stored into the user profile database 56 in correspondence to the specific user.

Figure 6:
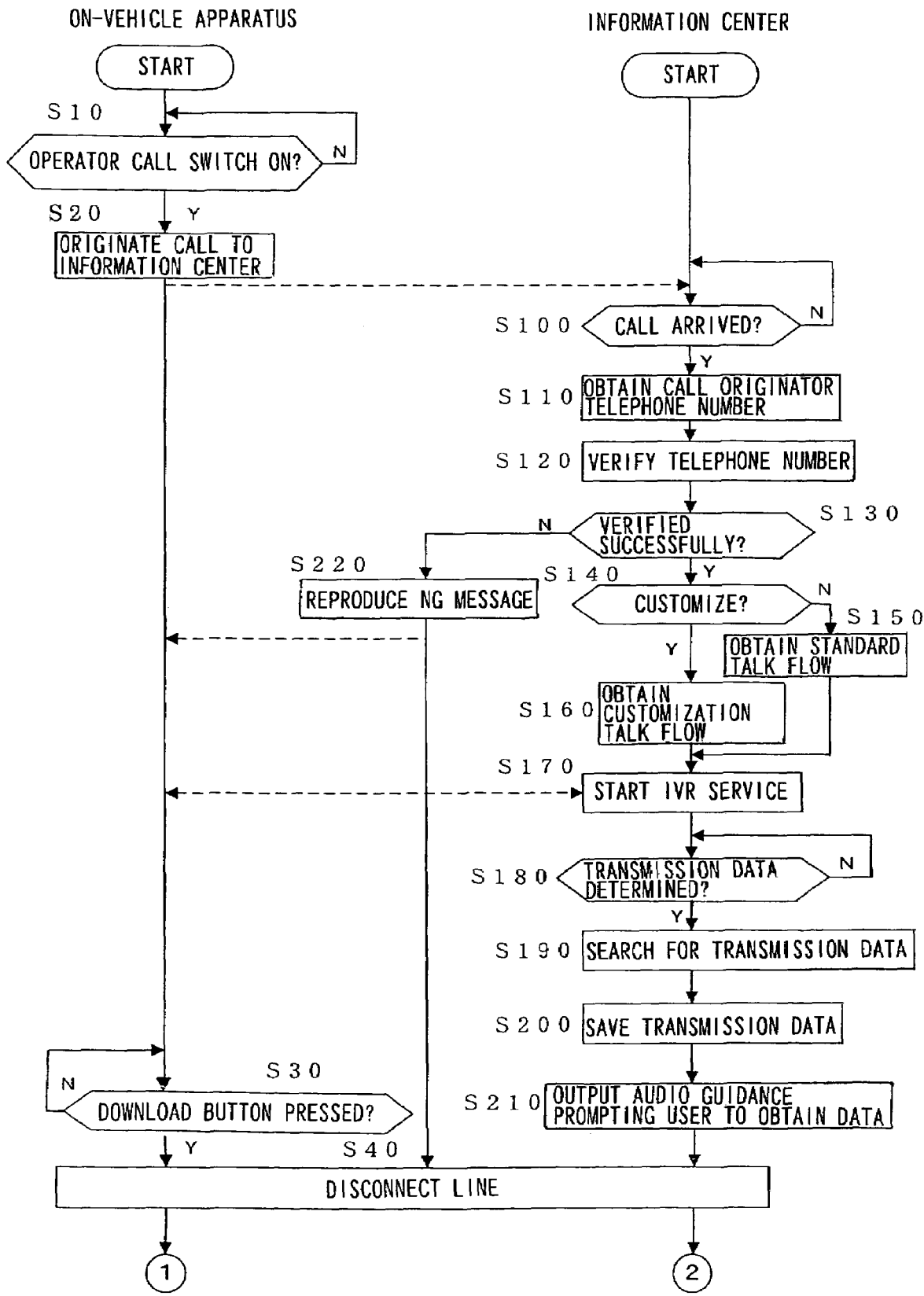
FIG. 6 presents a flowchart showing the details of the processing executed at the on-vehicle apparatus and the processing executed at the information center in the information providing system for vehicle in the first embodiment.
Figure 7:
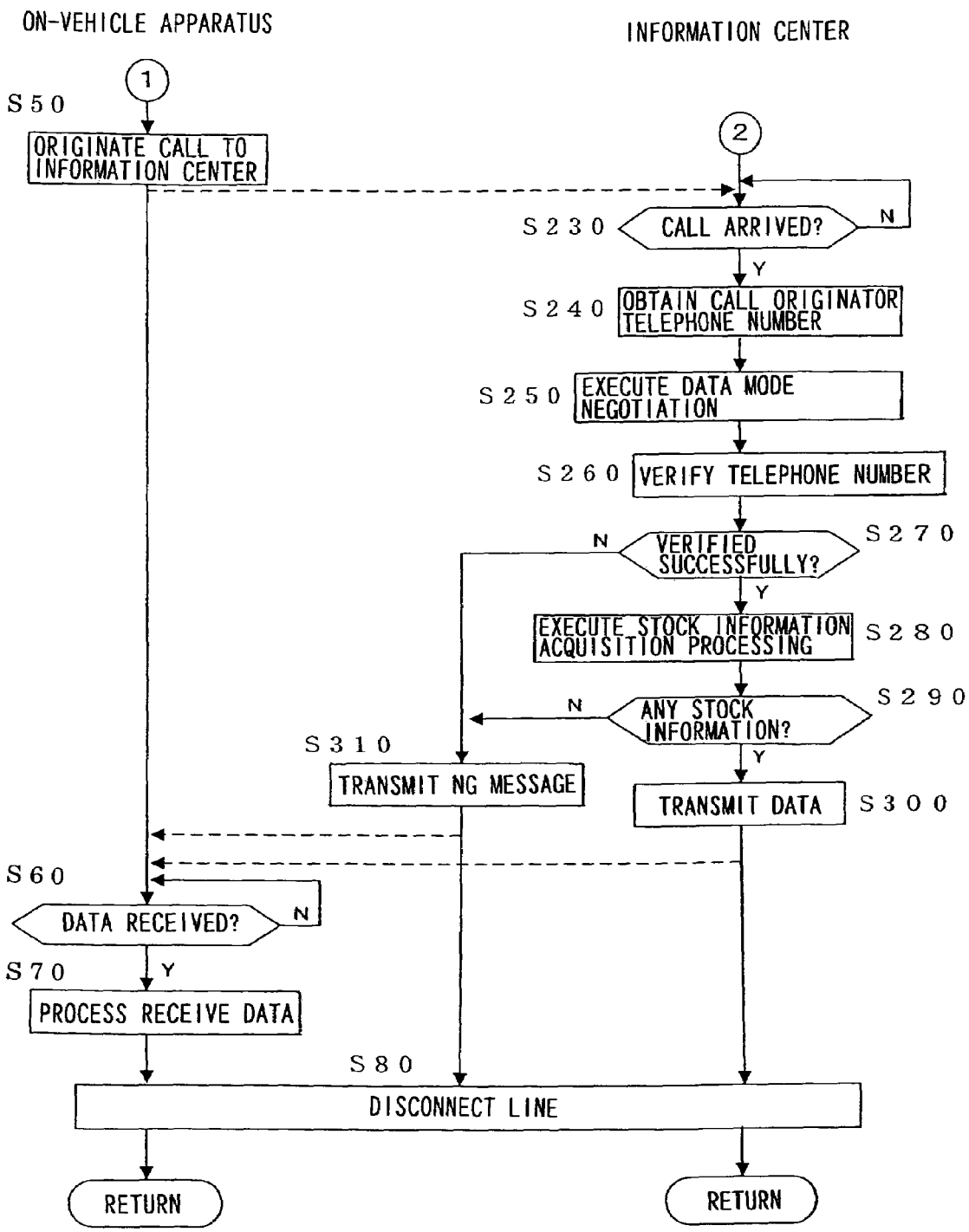
FIG. 7 presents a flowchart continuous from the flowchart in FIG. 6.

FIGS. 6 and 7 present the flowchart of the details of the processing executed at the on-vehicle apparatus 1 and the processing executed at the information center 20 in the vehicle information providing system in the first embodiment. In step S10, the on-vehicle apparatus 1 makes a decision as to whether or not the operator call switch 12 has been turned on. If it is decided that the operator call switch 12 has not been turned on, the operation waits in standby in step S10 until the operator call switch 12 is turned on, and once it is decided that the operator call switch 12 has been turned on, the operation proceeds to step S20.

In step S20, a telephone call is originated in talk mode to connect with the operation center 30 at the information center 20. It is to be noted that the term "talk mode" refers to a mode that enables the user to conduct a dialog with the IVR system 35. As explained earlier, the telephone number of the operation center 30 is pre-registered at the communication adapter 5 and thus, the telephone connection with the operation center 30 is automatically established via the navigation unit 2, the communication adapter 5 and the portable telephone 4 as the user presses the operator call switch 12.

It is to be noted that a function which allows the call originator number to remain undisclosed can be selected at the portable telephone 4. For this reason, the communication adapter 5 implements control so that the telephone call is originated with the originator number disclosed to the information center 20 to enable identification of the call originator.

Of the processing executed at the information center 20, steps S100, S110 and S220 are executed by the PBX/CTI 31 at the operation center 30. In step S100, a decision is made as to whether or not a telephone call from a user has arrived. If it is decided that no call has arrived, the operation waits in standby in step S100 until a call arrives, and once it is decided that a call has arrived, the operation proceeds to step S110.

In step S110, processing is executed to obtain the call originator telephone number. At this time, if the telephone call has been originated by selecting the caller undisclosed setting and thus, the call originator telephone number cannot be ascertained, a pre-registered message such as "caller number undisclosed" is reproduced before the telephone line is disconnected.

The processing in steps S120 through S210 is executed by the IVR system 35. In step S120, the telephone number is verified based upon the caller telephone number ascertained in step S110. This verification is executed based upon whether or not the caller telephone number is stored in the user profile database 56. In step S130 following step S120, a decision is made as to whether or not the caller telephone number has been successfully verified based upon the results of the telephone number verification executed in step S120. If it is decided that the caller telephone number ascertained in step S110 is stored in the user profile database 56 and thus, a successful verification has been made, the operation proceeds to step S140. If, on the other hand, it is decided that a successful verification has not been made, the operation proceeds to step S220 to reproduce a message such as "service cannot be provided to callers with unregistered telephone numbers" before the telephone line is disconnected.

In step S140, a decision is made as to whether or not the talk flow has been customized based upon the user information stored in the user profile database 56 together with the telephone number. As explained earlier, if the talk flow has been customized by the user by registering services to be given priority, the customized talk flow is stored in the user profile database 56. The IVR system 35 makes a decision as to whether or not the talk flow has been customized by checking the user profile database 56 to ascertain whether or not a customized talk flow is stored in correspondence to the user. If it is decided that the talk flow has been customized, the operation proceeds to step S160, whereas if it is decided that the talk flow has not been customized, the operation proceeds to step S150.

In step S150, the standard talk flow such as that shown in FIG. 3 is obtained and then the operation proceeds to step S170. It is to be noted that the standard talk flow may be stored in a ROM (not shown) at the IVR system 35. In step S160, the customized talk flow such as that shown in FIG. 5 is obtained before the operation proceeds to step S170.

In step S170, the IVR service commences in response to a phone call from the user. After the IVR service commences, a service desired by the user is determined through a dialogue in which the user responds to automatic audio prompts provided by the IVR system 35, as explained earlier in reference to FIG. 3 and FIG. 5. In step S180 following step S170, a decision is made as to whether or not the service desired by the user, i.e., the specific data to be transmitted to the user, have been determined. If it is decided that the data to be transmitted to the user has been determined, the operation proceeds to step S190, whereas the IVR service processing is continuously executed if it is decided that the data to be transmitted to the user have not yet been determined.

In step S190, the specific type of data having been determined is obtained by conducting a search of the information database group 40. These data may be "professional baseball news" or "weather information for the eastern area of California State" as explained earlier. Once the data to be transmitted to the user are obtained, the operation proceeds to step S200. In step S200, the data obtained in step S190 are saved into the user profile database 56 in correspondence to the user information on the user having issued the data transmission request.

FIG. 8 presents an example of the data stored into the user profile database 56 in step S200. The data shown in FIG. 8 includes information indicating the date and time at which the data were saved, the user ID, the portable telephone number of the call originator ascertained in step S110 and the stock information (the transmission data) obtained in step S190. The stock information includes information indicating the type of service, information indicating the title, text data indicating the contents of the information, image data and icon data. The service type is indicated by one of pre-assigned numbers corresponding to various types of information that can be provided, e.g., 10 for the traffic information and 11 for the weather information.

In step S200, the transmission data obtained in step S190 are stored into the user profile database 56 and then the operation proceeds to step S210. In step S210, pre-recorded audio guidance is provided to the user to prompt him to obtain the data (to download the data).

Upon hearing the audio guidance prompting him to download the data, the user presses the download button (not shown) among the operating switches 11. The on-vehicle apparatus 1 makes a decision in step S30 as to whether or not the user has pressed the download button. If it is decided that the download button has not been pressed, the operation waits in standby in step S30 until the download button is pressed, and once it is decided that the download button has been pressed, the operation proceeds to step S40.

In step S40, the telephone connection with the operation center 30 is first cut off. The telephone connection is first cut off to allow the user to download the data saved at the information center through data communication by reconnecting with the information center in data mode instead of talk mode. It is to be noted that the data mode is selected to exchange data through data communication.

In step S50 in the flowchart presented in FIG. 7, the user presses the download button and in response, a telephone call is automatically originated to connect with the vehicle information center 50 in the data mode. In this case, too, the call is originated under control through which the call originator number is disclosed.

The call originated via the navigation unit 2, the communication adapter 5 and the portable telephone 4 arrives at the PBX/CTI 52 at the vehicle information center 50 through the public network 55. The PBX/CTI 52 at the vehicle information center 50 makes a decision in step S230 as to whether or not a call has arrived. If it is decided that no call has arrived, the operation waits in standby in step S230 until a call arrives, whereas if it is decided that a call has arrived, the operation proceeds to step S240.

In step S240, the PBX/CTI 52 executes processing to obtain the call originator telephone number, and then the operation proceeds to step S250. The processing in step S250 through step S310 is executed at the information processing terminal 54. In step S250, the phone call originated by the user is connected to the information processing terminal 54 and a data mode negotiation is executed to establish the data mode. Upon completing the data mode negotiation, the processing is executed to verify the telephone number in step S260 following step S250. The method adopted to execute this verification processing is identical to that adopted for the processing executed in step S120 described earlier.

In step S270, a decision is made as to whether or not the call originator telephone number is stored in the user profile database 56 based upon the results of the verification processing executed in step S260. If it is decided that the call originator telephone number is stored in the user profile database 56 and has been verified successfully, the operation proceeds to step S280. If, on the other hand, it is decided that the call originator in number is not stored in the user profile database 56 and thus has not been verified successfully, the operation proceeds to step S310. In step S310, a message such as "service cannot be provided to callers with unregistered telephone numbers" is reproduced before the telephone line is disconnected.

In step S280, the data stored in the user profile database 56, i.e., the data saved into the user profile database 56 in step S200, are obtained. The data are obtained based upon the results of the telephone number verification executed in step S260. Namely, the data stored in correspondence to the telephone number which has been verified successfully are obtained. Once the data acquisition processing is completed, the operation proceeds to step S290.

In step S290, a decision is made as to whether or not data to be transmitted to the user are stored in the user profile database 56 based upon the results of the data acquisition processing executed in step S280. If it is decided that such data are stored in the user profile database 56, the operation proceeds to step S300, whereas if it is decided that no such data are stored, the operation proceeds to step S310. In step S310, an NG message such as "There is no information to be transmitted" is transmitted to the on-vehicle apparatus 1 before the line is disconnected. In step S300, on the other hand, the data obtained in step S280 are transmitted to the on-vehicle apparatus 1.

In step S60, the on-vehicle apparatus 1 makes a decision as to whether or not the data transmitted from the vehicle information center 50 in step S300 have been received. If it is decided that the data have not been received, the operation waits in standby in step S60 until the data are received, and once it is decided that the data have been received, the operation proceeds to step S70. In step S70, the received data (the downloaded data) are processed. For instance, if the received data are destination setting information, the navigation unit 2 executes destination setting processing. If the received data are general news information, the general news information is provided as an audio output through the speaker 9 and the contents of the news are displayed at the monitor 3. Once the received data are processed, the line connecting the on-vehicle apparatus 1 with the vehicle information center 50 is cut off in step S80.

It is to be noted that if the on-vehicle apparatus 1 is equipped with a data download saving function, the downloaded data are saved at the on-vehicle apparatus 1. In such a case, the user is allowed to check the downloaded information at his convenience by operating the operating switches 11 as necessary.

The information providing apparatus for vehicle in the first embodiment edits the contents of automatic audio guidance provided by the IVR system 35 based upon the information (services) pre-registered by the user and provides the edited audio guidance. As a result, the user can obtain information he wishes to obtain through a short dialogue. In addition, the information providing apparatus for vehicle achieves a high degree of convenience for the user as the user can indicate whether or not he wishes to receive pre-specified information (service) in response to the initial audio guidance.

Second Embodiment

The information providing system for vehicle that includes the information providing apparatus for vehicle in the second embodiment is now explained. The overall structure of the system is identical to that shown in FIG. 1. In the information providing system for vehicle in the first embodiment, a given user pre-registers services and the like to which he wishes to give priority in order to customize the talk flow of the IVR service provided by the IVR system 35 (see FIG. 5). In the information providing system for vehicle in the second embodiment, details of the services provided to each user are recorded in the user profile database 56 and the talk flow is customized for the user by the IVR system 35 based upon the customer's service preferences.

The details of the processing executed at the on-vehicle apparatus 1 and the information center 20 are substantially identical to those having been explained in reference to the flowchart presented in FIGS. 6 and 7. However, the processing in steps S140 through S160 is not executed at the IVR system 35 at the information center 20, and instead, the IVR service commences after processing for obtaining the standard talk flow is executed.

The IVR system 35 records the contents of the services determined through a dialogue with each user into the user profile database 56 in correspondence to the specific user. An example of the service contents recorded in the user profile database 56 is presented in FIG. 9. As shown in FIG. 9, the service contents recorded in the user profile database 56 include the dates on which individual services were utilized, the types of services that were utilized and the service conditions. A road name (condition 1) and an area name (condition 2), for instance, are entered as service conditions when the selected service type is traffic information.

The customer management server 66 at the customer center 60 reads the data indicating the service contents accumulated in correspondence to each user at the user profile database 56 and tabulates the data to determine the frequency with which each service has been utilized and also the frequency with which the service has been utilized under a given condition. The data may be tabulated regularly to determine the frequencies of use, e.g., every day or every month, or the data may be tabulated every time the user receives a service.

FIGS. 10A and 10B present examples of the results of service contents tabulation executed for a user. In FIG. 10A, the number of times services have been provided to the user is tabulated by classifying the data in correspondence to individual service types and individual service conditions. In FIG. 10B, the data are further classified in conformance to whether services were received on weekdays or holidays, in addition to the classifications made in FIG. 10A. The data may be even further classified according to time slots, e.g., morning (6:00 a.m. to 9:59 a.m.), mid-day (10:00 a.m. to 3:59 p.m.), evening (4:00 p.m. to 6:59 p.m.), night (7:00 p.m. to 9:59 p.m.) and midnight (10:00 p.m. to 5:59 a.m.).

Figure 11:
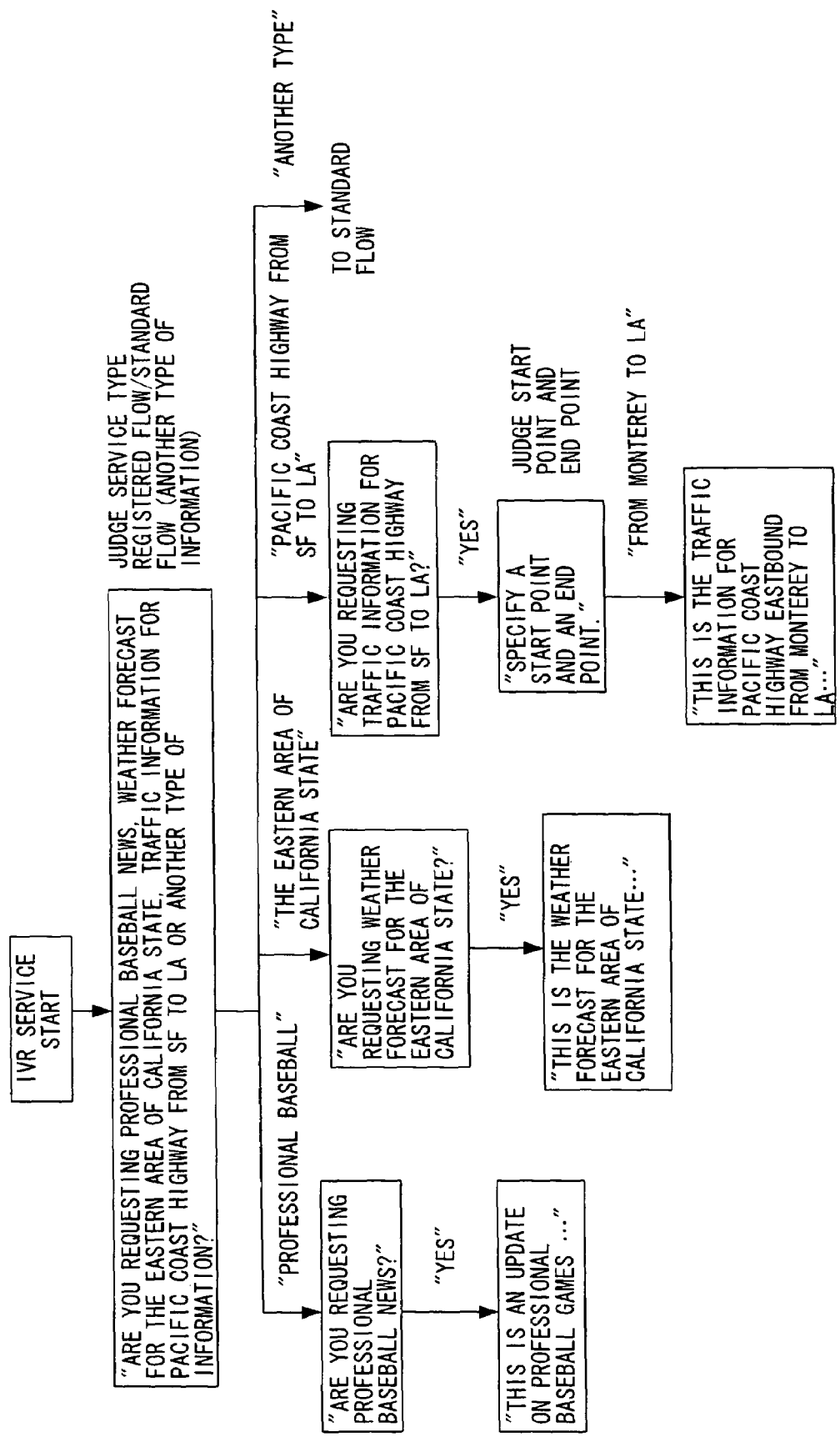
FIG. 11 presents an example of a talk flow customized in the information providing system for vehicle in a second embodiment.

The customer management server 66 customizes the talk flow for each user based upon the service contents tabulation data. FIG. 11 presents an example of a talk flow customized based upon the tabulation results shown in FIG. 10A. In the example presented in FIG. 11, the three most frequently utilized services among the services provided to the user in the past are built into the higher-order hierarchical layers in the talk flow. Namely, after the IVR service by the IVR system 35 commences, the user first receives an audio message "Do you wish to receive professional baseball information, weather forecast for the eastern area of California State, traffic information for Pacific Coast Highway between A-city and B-city or another service?" In response, the user specifies a desired service to download the corresponding information to the on-vehicle apparatus 1.

The method adopted to extract the services and conditions to be built into the higher-order hierarchical layers in the talk flow is now explained in reference to FIG. 12. Specific services and conditions are extracted in conformance to a selected number of services for extraction and a selected extraction level. If the number of services set for extraction is three, the three most frequently utilized services are extracted, as shown in FIG. 11. The extraction level refers to a level indicating a specific service condition to be extracted. For instance, when extracting traffic information at an extraction level 2, data corresponding to condition 2, i.e., the traffic information on the Pacific Coast Highway from A-city to B-city are extracted as shown in FIG. 10A. It is to be noted that if the extraction level is 1, the traffic information for the entire Pacific Coast Highway is extracted.

When the talk flow is customized based upon the tabulation results presented in FIG. 10B, the IVR service is adjusted depending upon whether it is provided on a weekday or on a holiday. As a result, the IVR service is provided to the user by reflecting typical use of services by the user on a given day.

The information providing apparatus for vehicle in the second embodiment tabulates a plurality of sets of information provided to the user in the past in correspondence to the individual information types and provides audio guidance customized for the user based upon tabulation results. As a result, the user can obtain the desired information by conducting a quick dialogue. In particular, since the audio guidance is customized in favor of the information (services) having been utilized most frequently by the user, the user is allowed to obtain the information he often needs through a short dialogue. In addition, the user himself does not need to customize his talk flow and thus, a higher level of convenience is afforded for the user.

Third Embodiment

The information providing apparatus for vehicle in the second embodiment records the contents of the services provided to each user into the user profile database 56 and customizes the talk flow for the user based upon the customer's preference for specific services. In the third embodiment, the information providing apparatus for vehicle records the questions asked by the IVR system 35 and the results of the speech recognition executed on the user's answers by the recognition engine 302 at the IVR system 35 are recorded into the user profile database 56 in addition to the contents of the services provided to the user. It is to be noted that the overall structure of the system is identical to that shown in FIG. 1.

FIGS. 13A and 13B present an example of data recorded into the user profile database 56. FIGS. 13A and 13B show that the verbal prompts for the user provided by the IVR system 35 and the results of speech recognition on the user's verbal responses to the prompts are recorded at the user profile database 56. If the IVR system 35 has been unable to recognize a specific speech, information indicating that a successful speech recognition has not been performed is recorded. In addition, the data in FIGS. 13A and 13B includes an instance of an erroneous recognition in which the IVR system 35 erroneously recognizes "Arizona State" spoken by the user as "Alabama State".

The processing executed at the on-vehicle apparatus 1 and the information center 20 is identical to the processing explained earlier in reference to FIGS. 6 and 7. As in the case of the vehicle information providing system in the first embodiment, the user needs to pre-register services which he wishes to give priority to. In this embodiment, the user can check the recorded data such as those shown in FIGS. 13A and 13B by accessing the user profile database 56 via the Internet 63 from the terminal 65 which may be a personal computer. In other words, the user can check the results of his interaction with the IVR system 35 to specifically register a service that the IVR system 35 has not been able to ascertain through speech recognition previously, a service with regard to which a word has been erroneously recognized, a service which the user wishes to utilize again or the like. Thus, the user is allowed to customize the talk flow based upon past data to achieve a higher level of convenience.

The information providing apparatus for vehicle in the third embodiment records the contents of the dialogue between the user and the IVR system 35 in the user profile database 56 and the user is allowed to check the recorded data when customizing the talk flow to result in a higher level of convenience in customization. Namely, since it is possible to give priority to a service which the IVR system 35 has not been able to ascertain through speech recognition in the past, a service with regard to which a word has been erroneously recognized or the like for registration, the user can promptly receive the same service next time.

The above described embodiments are examples, and various modifications can be made without departing from the spirit and scope of the invention. For instance, while the user is authenticated in step S120 in the flowchart presented in FIG. 6 and in step S260 in the flowchart presented in FIG. 7 based upon the portable telephone number, the user authentication may instead be executed based upon the user ID issued after the user registration. Alternatively, the user authentication may be executed based upon the on-vehicle apparatus ID inherent to the on-vehicle apparatus 1. In such a case, a serial ID number may be written on the on-vehicle apparatus ID before the on-vehicle apparatus 1 is shipped from the factory so that the user enters the on-vehicle apparatus serial ID number in the signup form at the time of user registration.

While the user starts downloading the information to the on-vehicle apparatus 1 by pressing the download button among the operating switches 11, the on-vehicle apparatus 1 may be equipped with a function of automatically starting a download, instead. In the latter case, it is no longer necessary to execute the processing in step S30 in the flowchart presented in FIG. 6, and the on-vehicle apparatus 1 can automatically establish a telephone connection in the data mode by detecting that the telephone connection in the talk mode has been cut off. In addition, a telephone connection in the talk mode and a telephone connection in the data mode may be established by using two separate telephones. In such a case, too, the stock data can be downloaded by using the telephone connected in the data mode after the telephone having been connected in the talk mode becomes cut off.

While the user customizes the talk flow of the interactive voice response service by accessing the Internet 63 from the terminal 65 such as a personal computer, information (a service) to be registered preferentially may be verbally communicated to the operator by originating a call to the customer center 60, instead. In such a case, the operator registers the information specified by the user.

In the flowchart presented in FIG. 6, as the data to be transmitted to the user are searched and obtained (step S190), the transmission data are first saved into the user profile database 56 (step S200) before the data are transmitted in the data mode. Alternatively the data may be provided in the form of an audio output by the IVR system 35 while the telephone line is connected in the talk mode. In this case, audio conversion processing is executed at the text-to-speech unit 305 to allow the information to be provided as an audio output.

In addition, while the data to be transmitted are saved at the user profile database 56 in the flowchart presented in FIG. 6, only the conditions attached with regard to each type of information to be transmitted may be saved, as shown in FIG. 14. In the latter case, the information processing terminal 54 searches for and obtains the information to be transmitted from the information database group 40 based upon the information providing conditions saved at the user profile database 56.

The disclosures of the following priority application is herein incorporated by reference:
Japanese Patent Application No. 2003-147872 filed May 26, 2003.

What is claimed is:

1. An information providing apparatus for a vehicle comprising:
an off-vehicle information storage device in which a plurality of different sets of information to be provided to a plurality of on-vehicle apparatuses, via a telephone line, are stored;
a user information storage device;
a customizing device configured to allow each of a plurality of users to customize audio guidance specific to each of the plurality of users and store the customized audio guidance in the user information storage device in correspondence to each of the plurality of users;
an interactive voice response device having a speech recognition function and providing audio guidance, configured to identify a user among the plurality of users, obtain the customized audio guidance specific to the identified user from the user information storage device and engage in a dialogue with the user through an automatic voice response via a telephone line using the customized audio guidance obtained from the user information storage device;
an information acquisition device configured to obtain a specific set of information from the off-vehicle information storage device based upon the dialogue between the user and the interactive voice response device that uses the customized audio guidance stored in the user information storage device; and
an information transmission device configured to transmit the specific set of information obtained by the information acquisition device to at least one of the plurality of on-vehicle apparatuses.

2. An information providing apparatus for vehicle according to claim 1, wherein:
when providing audio guidance to prompt the user to specify a desired set of information, the interactive voice response device first provides audio guidance to prompt the user to specify whether or not the user wishes to receive the specific set of information.

3. An information providing apparatus for vehicle according to claim 1, further comprising;
a dialog contents storage device in which contents of a dialogue conducted between each of the plurality of users and the interactive voice response device when providing information to each of the plurality of users are stored, wherein:
the dialog contents stored in the dialogue contents storage device are indicated to each of the plurality of users when customizing audio guidance.

4. An information providing apparatus for vehicle comprising:
an off-vehicle information storage device in which a plurality of different sets of information to be provided to a plurality of on-vehicle apparatuses, via a telephone line, are stored:
a user information storage device;
an interactive voice response device configured to engage in a dialogue with a user through an automatic voice response via a telephone line, to customize audio guidance and to store the customized audio guidance in the user information storage device for use in a subsequent dialogue with the user;
an information acquisition device configured to obtain a specific set of information from the off-vehicle information storage device based upon the dialogue between the user and the interactive voice response device; and
an information transmission device configured to transmit the specific set of information obtained by the information acquisition device to at least one of the plurality of on-vehicle apparatuses, wherein:
the interactive voice response device records information provided to the user in the past customizes the audio guidance by using a set of information most frequently provided to the user among different sets of information previously provided to the user, stores the customized audio guidance in the user information storage device in correspondence to the user, and engages in a dialogue with the user through an automatic voice response via a telephone line using the customized audio guidance stored in the user information storage device in correspondence to the user.

5. An information providing apparatus for vehicle comprising:
an off-vehicle information storage means for storing a plurality of different sets of information to be provided to a plurality of on-vehicle apparatuses via a telephone line;
a user information storage means;
a customizing means for allowing each of a plurality of users to customize audio guidance specific to each of the plurality of users and storing, the customized audio guidance in the user information storage means in correspondence to each of the plurality of users;

an interactive voice response means for having a speach recognition function, providing audio guidance, identifying a user among the plurality of users, obtaining the customized audio guidance specific to the identified user from the user information storage means and engaging in a dialogue with the user through an automatic voice response via a telephone line using the customized audio guidance obtained from the user information storage means;

an information acquisition means for obtaining a specific set of information from the off-vehicle information storage means based upon the dialogue between the user and the interactive voice response means that uses the customized audio guidance stored in the user information storage means; and an information transmission means for transmitting the specific set of information obtained by the information acquisition means to at least one of the plurality of on-vehicle apparatuses.

\* \* \* \* \*